(12) United States Patent
Salanne et al.

(10) Patent No.: US 10,913,544 B2
(45) Date of Patent: Feb. 9, 2021

(54) METHOD AND A SYSTEM FOR POWERING AN ELECTRICAL LOAD IN AN AIRCRAFT

(71) Applicants: SAFRAN, Paris (FR); SAFRAN ELECTRICAL & POWER, Blagnac (FR)

(72) Inventors: Jean-Philippe Salanne, Moissy-Cramayel (FR); Stephane Petibon, Moissy-Cramayel (FR); Florent Rougier, Moissy-Cramayel (FR); Antoine Duquerrois, Blagnac (FR)

(73) Assignees: SAFRAN, Paris (FR); SAFRAN ELECTRICAL & POWER, Blagnac (FR)

( * ) Notice: Subject to any disclaimer, the term of this patent is extended or adjusted under 35 U.S.C. 154(b) by 43 days.

(21) Appl. No.: 16/331,418

(22) PCT Filed: Sep. 12, 2017

(86) PCT No.: PCT/FR2017/052415
§ 371 (c)(1),
(2) Date: Mar. 7, 2019

(87) PCT Pub. No.: WO2018/051003
PCT Pub. Date: Mar. 22, 2018

(65) Prior Publication Data
US 2019/0225348 A1    Jul. 25, 2019

(30) Foreign Application Priority Data

Sep. 13, 2016  (FR) ..................................... 16 58501

(51) Int. Cl.
*B64D 41/00*     (2006.01)
*H02J 3/28*      (2006.01)
(Continued)

(52) U.S. Cl.
CPC ............ *B64D 41/00* (2013.01); *B64D 41/007* (2013.01); *H02J 3/28* (2013.01); *H02J 4/00* (2013.01);
(Continued)

(58) Field of Classification Search
CPC .......... B60L 11/00; B60L 11/14; B60R 16/00; B60R 16/03; B60R 16/0315;
(Continued)

(56) References Cited

U.S. PATENT DOCUMENTS

2007/0228735 A1   10/2007  Becker
2009/0206601 A1   8/2009   Becker
(Continued)

FOREIGN PATENT DOCUMENTS

EP    0 657 985 A1    6/1995
EP    2 530 780 A1    12/2012
(Continued)

OTHER PUBLICATIONS

International Search Report dated Apr. 10, 2018 in PCT/FR2017/052415 filed Sep. 12, 2017.

*Primary Examiner* — Lincoln D Donovan
*Assistant Examiner* — Dave Mattison
(74) *Attorney, Agent, or Firm* — Oblon, McClelland, Maier & Neustadt, L.L.P.

(57) ABSTRACT

A method of electrically powering an electrical load in an aircraft, the method including electrically powering the electrical load with a main source that generates electricity; measuring an instantaneous parameter characterizing the main source; determining a level of use of the main source from the measured instantaneous parameter; adjusting the voltage of the main source as a function of the level of use; measuring an output voltage from the main source; comparing the measured voltage or the level of use with a (Continued)

predetermined threshold value; and whenever the measured voltage is less than the predetermined threshold value, electrically powering the electrical load from an auxiliary source that stores electricity so as to supply additional electric power to the electrical load.

8 Claims, 1 Drawing Sheet

(51) Int. Cl.
  *H02J 7/34* (2006.01)
  *H02J 4/00* (2006.01)
  *H02J 3/32* (2006.01)
  *F03D 9/32* (2016.01)

(52) U.S. Cl.
  CPC .......... *H02J 7/34* (2013.01); *B64D 2041/005* (2013.01); *B64D 2221/00* (2013.01); *F03D 9/32* (2016.05); *F05B 2220/31* (2013.01); *H02J 3/32* (2013.01); *H02J 7/345* (2013.01); *Y02E 10/72* (2013.01); *Y02E 10/76* (2013.01)

(58) Field of Classification Search
  CPC .......... B64D 2041/00; B64D 2041/005; B64D 2221/00; B64D 41/00; B64D 41/007; F03D 9/00; F03D 9/32; F05B 2220/00; F05B 2220/31; H02J 2310/00; H02J 2310/44; H02J 3/00; H02J 3/28; H02J 3/32; H02J 4/00; H02J 7/00; H02J 7/34; H02J 7/345; Y02E 10/00; Y02E 10/725; Y02E 10/766; Y02T 10/7005; Y02T 10/7077
  USPC .......................................................... 307/9.1
  See application file for complete search history.

(56) References Cited

U.S. PATENT DOCUMENTS

| | | |
|---|---|---|
| 2009/0212561 A1 | 8/2009 | Becker |
| 2009/0212747 A1 | 8/2009 | Becker |
| 2009/0224540 A1 | 9/2009 | Becker |
| 2009/0230680 A1 | 9/2009 | Becker |
| 2009/0234509 A1 | 9/2009 | Becker |
| 2012/0221157 A1 | 8/2012 | Finney et al. |
| 2012/0308850 A1 | 12/2012 | Bernard |
| 2012/0318914 A1 | 12/2012 | Rajashekara et al. |
| 2014/0032002 A1* | 1/2014 | Iwashima ............ B64D 41/007 700/295 |
| 2015/0165990 A1 | 6/2015 | Iwashima et al. |

FOREIGN PATENT DOCUMENTS

| | | |
|---|---|---|
| EP | 2 651 007 A2 | 10/2013 |
| FR | 2 936 220 A1 | 3/2010 |
| FR | 2 976 558 A1 | 12/2012 |

* cited by examiner

METHOD AND A SYSTEM FOR POWERING AN ELECTRICAL LOAD IN AN AIRCRAFT

BACKGROUND OF THE INVENTION

The invention relates to hybridization, i.e. to using different sources of electricity in an aircraft simultaneously. More precisely, the invention relates to a method and to a system of supplying electrical power to electrical loads in an aircraft from a main source and from an auxiliary source. The invention relates to an electrical power supply. Consequently, it does not affect the electricity consumers present on the electrical network in the sense that it does not require the network to shed any electrical load. The purpose of the source is to supply the electrical power requested by the network within the limits of its capabilities.

By way of example, in the description below, the aircraft under consideration is an airplane.

An emergency source of electricity commonly used in an airplane is in the form of an emergency wind turbine, frequently referred to as a ram air turbine (RAT).

An emergency RAT is deployed in emergency situations on board an airplane in order to generate appropriate electrical power so as to enable the airplane to fly for sufficient time to be able to land. The emergency RAT comprises a propeller made up of blades for which the speed of rotation is a function of the speed of the air flowing against the airplane and of the electrical load constituted by the various electrical power supply buses of the airplane. Rotation of the propeller drives a generator, which supplies the emergency power needed to a bus that electrically powers certain critical electrical loads such as the flight controls and key avionics circuits.

Typically, an emergency RAT is designed to supply power at a maximum value suitable for satisfying potential peaks in the electricity consumption of the airplane network. In practice, such peaks occur rarely. Most of the time, the electricity power demand is much smaller, and the emergency RAT is capable of delivering more electrical power than is required.

This results in emergency RATs being overdimensioned, bulky, heavy, and expensive.

In order to avoid such overdimensioning, it is known to hybridize the main source of electricity, the emergency RAT in this example, in parallel with an auxiliary source of electricity, e.g. a source made up of supercapacitors, batteries, etc., in order to supply simultaneously the power that is lacking.

Other types of electrical hybridization can be implemented on the same principle, and by way of example:
  associating a fuel cell as a main source of electricity in parallel with an auxiliary source of electricity so as to avoid any risk of the fuel cell drowning and/or suffering premature deterioration; and
  associating an auxiliary power unit (APU) fed with fuel as the main source of electricity in parallel with an auxiliary source of electricity in order to avoid any risk of the APU consuming too much fuel or overheating.

A main source of electricity is usually hybridized with an auxiliary source of electricity on the basis of a frequency sharing model, as disclosed in application US 2009/121546. That model consists in splitting a power profile in terms of frequency as a mean value and as a fluctuating value: by way of example, the main source supplies the main power at low frequency, while the auxiliary source supplies the power needed above a predetermined frequency.

Such an approach enables the sources of electricity to be sized appropriately and requires the power that is to be supplied to be subjected to frequency filtering and thus to instantaneous measurements (e.g. current measurements) at the electrical loads that are to be powered.

Furthermore, selecting to use one source of electricity instead of another on the basis of a frequency criterion does not enable the use of those sources to be optimized. In particular, it is not possible to draw some maximum level of power from the main source of electricity. For example, when the main source is an emergency RAT, the power available does not depend on the frequency with which power is drawn from it, but on the speed and the density of the surrounding air driving the blades. The main source is capable of supplying a power demand, which can be resolved as a mean power and as a fluctuating power, only as a function of the surrounding air having a certain speed. Thus, an emergency RAT can supply no more than some maximum power depending on the speed of the air driving its rotation. As a result, in the absence of instrumentation serving to measure the speed and the density of the surrounding air, and in the absence of control logic for using such measurements to determine how much electrical power to take from the emergency RAT, i.e. with source selection being limited to a frequency criterion, there is a danger of observing that the emergency RAT is under-used while the speed of the air is high (the turbine produces more power than necessary), or else is in a stalling situation if the speed of the air is not sufficient (the RAT cannot supply the power demanded because the speed of the airplane is too slow).

Furthermore, it can be found complicated to determine a sharing frequency between two sources of electricity, in particular with an alternating current (AC) electricity network. Such frequency sharing can then imply the need for permanent communication between the various sources of electricity. For example, when the main source of electricity is a fuel cell, frequency sharing can be performed by measuring current at various electricity consumers, and then informing the main source and the auxiliary source of those measurements, in order to adapt the power taken from each of the sources.

In order to optimize electricity consumption from hybridized sources, another known solution relies on using algorithms involving maximum power point tracking (MPPT). Such a solution then makes it possible to use the maximum potential of the hybridized main source, but it implies using algorithms that are often complex.

At present, the above-mentioned solutions for making simultaneous use of sources of electricity in an aircraft are found to be limited, in particular in terms of efficiency and of being complex to use.

OBJECT AND SUMMARY OF THE INVENTION

An object of the present invention is to remedy the above-mentioned drawbacks. More precisely, an object of the present invention is to propose a solution making it possible in real time to optimize the consumption of electricity drawn from hybridized sources, while limiting the complexity of providing such a solution.

To this end, the invention provides a method of electrically powering at least one electrical load in an aircraft, the method comprising:
  electrically powering said at least one electrical load by means of a main source that generates electricity;
  measuring at least one instantaneous parameter characterizing the main source;

determining a level of use of the main source from said at least one measured instantaneous parameter;

adjusting the voltage of the main source as a function of the determined level of use;

measuring an output voltage from the main source;

comparing the measured voltage with a predetermined voltage threshold value; and electrically powering said at least one electrical load from an auxiliary source that stores electricity whenever the measured voltage is less than the predetermined voltage threshold value, so as to supply additional electric power to the electrical load.

This method is particularly advantageous in that it is a real time method, and it makes it possible at any instant to optimize the consumption taken from the main source that generates electricity. All of the operations described above are performed in parallel, simultaneously and continuously over time. In addition, the method does not require communication to be set up between the main source and the auxiliary source. Specifically, these sources are coordinated in order to power the electrical load of the aircraft solely on the basis of determining the level of use of the main source, e.g. determined relative to the voltage of the electricity network powering the electrical loads of the aircraft. Thus, unlike the prior art, this method does not require the currents of the various electricity consumers to be measured, nor does it require those values to be communicated to the sources. Such a method is also simple to implement and it does not require a complex control algorithm. The programming of the calculation means is thus likewise simplified.

In another aspect, the method may further comprise causing the voltage supplied by the main source to decrease towards a preconfigured value whenever the level of use of the main source is greater than a predetermined level of use.

In another aspect, the method may include a step of switching off the electrical power supplied by the auxiliary source whenever the voltage measured at the output from the main source is greater than the predetermined voltage threshold value.

In another aspect, in this method, the main source is an emergency RAT, and said at least one instantaneous parameter is the torque of the RAT, the electrical frequency of the power supply to the electrical load, the speed of rotation of the blades of the RAT, and/or the pitch of the blades of the RAT.

In another aspect, in this method, the main source is a fuel cell, and said at least one instantaneous parameter is a reagent flow rate, a temperature of the cell, and/or a degree of hydration of the cell.

In another aspect, in this method, the main source is an APU, and said at least one instantaneous parameter is a flow rate of fuel delivered to said APU and/or a temperature of said APU.

The invention also provides a method of electrically powering at least one electrical load in an aircraft, the method comprising:

electrically powering said at least one electrical load from a rotary main source that generates electricity, the frequency of rotation of the rotary main source being regulated to lie within a predetermined frequency range;

measuring the electrical frequency output by the rotary main source;

comparing the measured electrical frequency with a predetermined frequency threshold value; and whenever the electrical frequency output by the main source reaches a frequency threshold value, causing an auxiliary source that stores electricity to power said at least one electrical load at an electrical frequency that is synchronized on the electrical frequency of the main source, so as to supply additional electric power to the electrical load.

In an implementation, such a method may also comprise:

measuring the frequency of rotation of the main source; and adjusting the voltage of the main source as a function of the measured frequency of rotation.

Such a method is particularly advantageous in that it is a real time method and at all instants it adapts the consumption taken from the main source. Furthermore, such a method does not require any structural modification to the rotary main source, so such a method can be applied to any rotary main source. In addition, the method does not require communication to be set up between the main source and the auxiliary source. Specifically, these sources are coordinated for powering the electrical loads of the aircraft on the basis solely of determining the frequency of rotation of the main source. The frequency of rotation of the main source may be deduced from the electrical frequency output by that source, this frequency determination commonly already being implemented in existing rotary main sources. Thus, unlike the prior art, this method does not require the currents of the various electricity consumers to be measured, nor does it require those values to be communicated to the sources. Such a method is also simple to implement and does not involve a complex control algorithm. Once again, this enables the calculation means to be programmed in simplified manner.

The invention also provides a system for electrically powering at least one electrical load in an aircraft, the system comprising:

a main source of electricity;

an auxiliary source for storing electricity connected in parallel with the main source via a DC/AC power converter; and the main source and the converter also being electrically connected to at least one electrical load;

the system comprising a first control device configured:

to cause said at least one electrical load to be electrically powered by the main source that generates electricity;

to determine a level of use of the main source from a measurement of at least one instantaneous parameter characterizing said source; and to adjust the voltage of the main source as a function of the determined level of use;

the system further comprising a second control device configured:

to recover a measurement of the voltage across the terminals of the converter;

to compare the measured voltage with a predetermined voltage threshold value; and whenever the measured voltage is less than the predetermined voltage threshold value, to act via the converter to cause said at least one electrical load to be powered electrically by the auxiliary source for storing electricity, so as to supply additional electric power to the electrical load.

In an aspect of this system, the first control device is also configured to cause the voltage supplied by the main source to decrease towards a preconfigured value when the level of use of the main source is greater than a predetermined level of use.

In an aspect of this system, the second control device is also configured to cause the electrical power supplied by the auxiliary source to be switched off when the voltage measured at the output from the main source is greater than the predetermined voltage threshold value.

In an aspect of this system, the main source is an emergency RAT, and said at least one instantaneous parameter is the torque of the RAT, the frequency at which electricity is supplied to the electrical load, the speed of rotation of the blades of the RAT, and/or the pitch of the blades of the RAT.

In an aspect of this system, the main source is a fuel cell, and said at least one instantaneous parameter is the flow rate of reagents, a temperature of the cell, and/or a degree of hydration of the cell.

In an aspect of this system, the main source is an APU, and said at least one instantaneous parameter is a flow rate of fuel delivered to the APU, and/or a temperature of the APU.

The invention also provides a system for electrically powering at least one electrical load in an aircraft, the system comprising:
  a rotary main source that generates electricity;
  an auxiliary source that stores electricity and that is connected in parallel with the main source via an DC/AC power converter; and
  the rotary main source and the converter also being electrically connected to at least one electrical load;
  the system comprising a first control device configured:
  to control the supply of electrical power to said at least one electrical load by the rotary main source that generates electricity, the frequency of rotation of the rotary main source being regulated within a predetermined frequency range;
  the system further comprising a second control device configured:
  to recover a measurement of the electrical frequency output by the rotary main source;
  to compare the measured electrical frequency with a predetermined frequency threshold value; and
  whenever the electrical frequency output by the main source reaches a frequency threshold value, to act via the converter to cause the auxiliary source for storing electricity to power said at least one electrical load at an electrical frequency synchronized on the electrical frequency of the main source, so as to supply additional power to the electrical load.

In an embodiment, the first control device may also be configured:
  to recover a measurement of the frequency of rotation of the rotary main source; and
  to adjust the voltage of the rotary main source as a function of the measured frequency of rotation.

In an aspect of the various systems described above, the main source is a fuel cell, an APU, a gas turbine, or an emergency RAT constituting a voltage source.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

Figure 1:
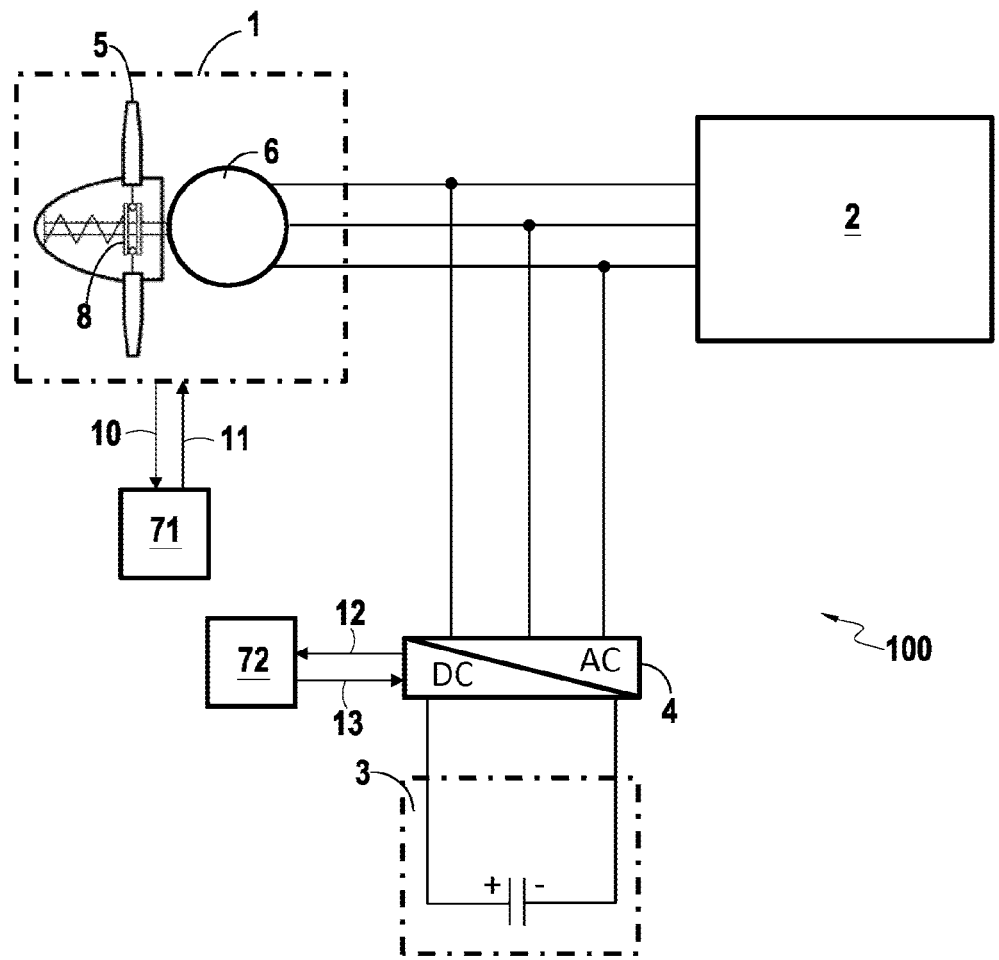
FIG. 1 shows an embodiment of an electricity power supply device in an aircraft.

FIG. 1 shows an embodiment of an electricity source supply device 100 in an aircraft, the device comprising:
  a main source 1 for generating electricity, commonly referred to as the "main generator", which is connected to at least one electrical load 2; and
  an auxiliary source 3 for storing electricity, which is connected in parallel with the main source of electricity by means of a converter 4, e.g. a DC/AC power converter for an electricity network that operates with AC.

In the example of FIG. 1, the main source 1 that generates electricity is an emergency RAT having blades 5 and an electricity generator 6 connected to the electrical load 2 so as to power it electrically. Nevertheless, it is possible to envisage using other main sources 1 that generate electricity, for example: a fuel cell, a gas turbine, or indeed a fuel-powered APU.

The auxiliary source 3 for storing electricity may be made using one or more storage elements such as storage batteries, supercapacitors, flywheels, or indeed by associating such various elements.

The auxiliary source 3 for storing electricity serves to power the converter 4 electrically. The converter 4 then delivers additional electric power to the electrical load 2, where necessary, thereby supplementing the main source 1. By way of example, such additional power may be delivered in order to avoid any risk of the emergency RAT stalling, or any risk of a fuel cell drowning, when a turbine or a fuel cell are used as the main source 1, and when the power drawn from the main source 1 reaches a predetermined level.

In the embodiments described below, the main source 1 and the auxiliary source 3 are voltage sources. Nevertheless, one of these sources could be a current source.

Furthermore, although only one electrical load 2 is shown herein, it should be understood that the main source 1 that generates electricity and the converter 4 may be connected by means of an electrical power supply bus to a plurality of electrical loads 2. By way of example, the electrical loads 2 are flight control actuators, calculation units, or indeed electrical loads that are essential to proper conduct of the flight of the aircraft.

In various embodiments, the electrical load 2 may be powered as follows.

In a first embodiment, the main source 1 that generates electricity and the auxiliary source 3 that stores electricity are preconfigured/predimensioned so as to be capable of controlling/monitoring their static voltage characteristics while they are in use.

By way of example, when the main source 1 is an emergency RAT, it may be dimensioned so as to preconfigure the generator 6 so that it delivers a constant voltage V0 under predefined nominal conditions of use. By way of example, such nominal conditions of use may consist in an electrical frequency that depends on the conditions of use of the emergency RAT (speed of the air, electrical power drawn).

Figure 2:
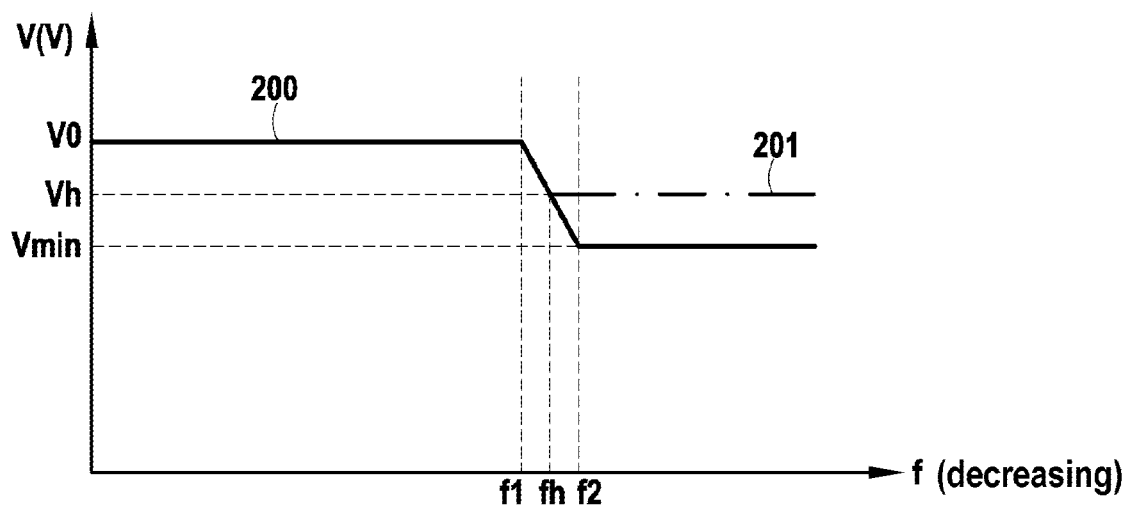
FIG. 2 shows the static voltage characteristics of a main electricity source and of an auxiliary electricity source in an embodiment.

By way of example, FIG. 2 plots voltage V up the ordinate axis showing a static voltage characteristic 200 of an emergency RAT that is predimensioned as a function of a decreasing electrical frequency f that it delivers, plotted along the abscissa axis. In the embodiment shown, the voltage V is deliberately correlated with the frequency f. As can be seen on the curve, the static characteristic 200 of the voltage V delivered by the emergency RAT is dimensioned so as to supply a constant value V0 so long as the frequency f lies in a frequency band higher than a first predetermined threshold value f1. By way of example, the frequency f1 is pre-identified as a frequency value characterizing an increase in the level of use being made of the main source 1, i.e. an increase in the power taken from the source by the electrical load 2. Beyond this frequency f1, the level of use being made of the main source 1 may continue to increase until it comes close to a situation in which the main source 1 is overused, close to a stalling condition that should be avoided. The frequency band is then determined in order to correspond to the nominal conditions selected so that the emergency RAT delivers the constant voltage V0.

The static voltage characteristic 201 delivered by the auxiliary source 3 is preconfigured to a constant voltage value Vh lower than the value V0. When the frequency of the emergency RAT is less than the predetermined threshold value f1, i.e. when the of use being made of the main source 1 increases, its voltage characteristic can then be controlled so as to decrease. The electrical power delivered by the emergency RAT nevertheless remains constant. The predetermined threshold value f1 corresponds to a frequency from which the emergency RAT is no longer delivering the voltage value V0 to the electrical load 2 under nominal conditions. It should be recalled that this threshold value f1 results from the predimensioning selected for the static voltage characteristic 200 of the main source 1. It is also possible to omit such predimensioning. In its absence, the main source 1 could then continue to deliver the voltage V0, while its speed of rotation drops until it reaches a stalling limit for the emergency RAT.

In order to avoid any risk of the emergency RAT stalling, once the frequency reaches the level fh and the voltage V reaches the level Vh of the auxiliary source 3, the auxiliary source 3 is then controlled so as to deliver the voltage Vh via the converter 4. By way of example, the frequency fh is selected as a frequency value that is characteristic of the main source 1 being overused, close to a stalling condition and thus requiring the auxiliary source 3 to be triggered to supply electricity.

Optionally, the emergency RAT may be controlled so as to decrease its voltage (linearly or otherwise) down to a preconfigured value Vmin that is reached at a predetermined frequency f2 that is lower than the frequency fh while the auxiliary source 3 is delivering the voltage Vh. The reduction in the voltage from the main source 1 is once more the result of the predimensioning selected for its static characteristic 200, with the reduction in the voltage V implying triggering the supply of electricity from the auxiliary source 3 as soon as the voltage Vh is reached. Specifically, in the absence of such predimensioning, the main source 1 could continue to deliver a constant voltage V0 until it reaches its stalling limit.

The same types of static voltage characteristic can be predimensioned for a main source 1 that is not necessarily an emergency RAT, e.g. a fuel cell. The voltage V0 may then be the constant voltage delivered by the fuel cell under nominal conditions of use, and Vh may be the voltage of the auxiliary source 3 that is delivered in order to avoid any risk of the fuel cell drowning.

More generally, the static voltage characteristics of the main source 1 and of the auxiliary source 3 are dimensioned as a function of a level of use of the main source 1. This level of use is determined, e.g. measured or observed, on the basis of at least one instantaneous parameter characterizing the source. In the above example, the decision to cause the auxiliary source 3 to deliver electrical power is taken as a function of variation in the voltage V from the emergency RAT. This voltage V is correlated with the frequency f, which thus constitutes the instantaneous parameter that, in this example, characterizes the level of use of the emergency RAT.

Nevertheless, as a function of the selected main source 1, other parameters may be taken into consideration for determining the level of use of the main source 1. For example, when the main source 1 is:

an emergency RAT, its level of use may be determined from at least one of the following instantaneous parameters: electrical frequency at which the electrical load 2 is powered; speed of rotation of the blades 5 of the propeller; pitch of the blades 5; density of the air; speed of the airplane; torque of the emergency RAT;

a fuel cell, its level of use may be determined from at least one of the following instantaneous parameters: temperature of the cell; flow rates and flow rate derivatives of the reagents (oxidizers or fuels); degree of hydration of the cell; pressure and pressure derivatives of the reagents; pressure difference between the reagents;

a gas turbine, its level of use may be determined from at least one of the following instantaneous parameters: frequency of the electricity network powering the electrical load 2; speed of rotation of the gas turbine shaft; temperature of the turbine; flow rates or flow rate derivatives of kerosene; and an auxiliary power unit (APU), its level of use may be determined from at least one of the following instantaneous parameters: electrical frequency at which the electrical load 2 is powered; temperature of the APU; flow rates or flow rate derivatives of kerosene.

Thus, the abscissa axis in the particular example of FIG. 2 can therefore be generalized to any predetermined parameter that characterizes the level of use of the main source 1 when determining the static voltage curves for the main source 1 and for the auxiliary source 3.

Once the static voltage curves for the main source 1 and for the auxiliary source 3 have been preconfigured/predetermined, the electrical load 2 may be powered electrically as follows.

The electrical load 2 is powered electrically by the main source 1, e.g. it is powered at a voltage V0 in the particular example described above.

While the electrical load 2 is being powered by the main source 1, the level of use of the main source 1 is determined on the basis of at least one instantaneous parameter characterizing that source. The instantaneous parameter(s) is/are selected from the parameters mentioned above by way of example, and consideration may be given to the speed of the blades 5 of an emergency RAT or to the degree of hydration of a fuel cell in order to determine the level of use of those main sources 1 by the electrical load 2.

The level of use of the main source 1 is then compared with a predetermined level of use. By way of example, this predetermined level of use is correlated with the frequency f1 in FIG. 2, which is the frequency from which the emergency RAT no longer delivers electricity to the electrical load 2 under nominal conditions at the voltage V0. It should be recalled that such a frequency f1 is the result of the value predetermined for the static voltage characteristics of the main source 1. As from this frequency f1, the level of use of the main source 1 begins to increase. In another example, if the main source 1 is a fuel cell, then this level of use may be correlated with a predetermined degree of hydration from which the cell can no longer supply constant power to the electrical load 2 under nominal conditions. More generally, an increase in the level of use means that the main source 1 is coming closer to its stalling point. A predetermined level of use of the main source 1 is identified that precedes the level of use that corresponds to reaching a stalling condition, which is to be avoided.

Thus, the power supplied by the main source 1 is adjusted as a function of its level of use. In particular, if the level of use of the main source 1 is greater than or equal to a predetermined level of use, then the main source 1 may be controlled to deliver a continuing decrease in the voltage V. For example, in FIG. 2, the voltage of the main source 1 is decreased in continuous manner down to a voltage Vmin, which is reached at a frequency f2. The electrical power from the main source 1 is not controlled, and it remains constant.

In parallel, voltage is measured across the terminals of the converter 4. Advantageously, this voltage measurement serves to determine the level of use of the main source 1.

This voltage measurement may be compared directly with a predetermined threshold value, which value is correlated with an instantaneous parameter representing a situation close to overuse of the main source 1. By way of example, this voltage threshold value is the voltage Vh correlated with the frequency fh.

Alternatively, the voltage measurement may be used to deduce the level of use of the main source 1, this level of use then being compared with a limit level of use close to a stalling situation of the main source 1, which is to be avoided.

Thus, when the measured voltage is less than or equal to the predetermined voltage threshold value, or alternatively when the level of use deduced from the measured voltage reaches the limit level of use, the converter 4 is controlled so that the auxiliary source 3 powers the electrical load 2 electrically. The auxiliary source 3 thus acts in addition to the main source 1 to power the electrical load 2, thereby avoiding overuse of the main source 1. By way of example, with an emergency RAT, such regulation serves to avoid the turbine stalling as a result of the electrical load 2 consuming too much power, or as a result of a drop in the speed of air driving the blades 5. Such regulation also makes it possible to optimize the maximum electrical load taken from the main source 1.

Furthermore, when the level of use of the main source returns to below the limit level of use, the voltage measured across the terminals of the converter 4 becomes higher than the predetermined voltage value since the system is no longer potentially in a situation of the main source 1 being overused. The converter 4 is then controlled to stop the auxiliary source 3 delivering additional electrical power to the electrical load 2.

Advantageously, all of the above-described operations are performed in parallel, in real time, and continuously over time. These various operations may be controlled and monitored by a first control device 71 interfaced with the main source 1 and by a second control device 72 interfaced with the auxiliary source 3 via the converter 4. The first and second control devices 71 and 72 are independent devices in the sense that there is no direct communication link between them.

The first control device 71 is configured:
to cause the main source 1 to supply electric power, e.g. to control variations in the voltage of an emergency RAT as a function of the electrical frequency it delivers;
to recover (arrow 10) in real time at least one measured instantaneous parameter characterizing the main source 1;
to determine the level of use of the main source 1 as a function of the recovered instantaneous parameter; and
to adjust (arrow 11) the power supply voltage from the main source as a function of the level of use that has been determined for the main source 1, e.g. to cause the voltage delivered by the main source 1 to decrease towards a preconfigured value when the level of use of the main source 1 is above a predetermined threshold value.

Since the converter 4 is connected in parallel with the main source 1, the second control device 72 is capable of determining the voltage at the output from the main source 1, i.e. the voltage of the electrical bus powering the electrical load 2. The second control device 72 is then configured:
to recover (arrow 12) a measurement of the voltage across the terminals of the converter 4;
to compare this voltage measurement with a predetermined voltage threshold value, e.g. characterizing overuse of the main source 1. Or alternatively, to deduce the level of use of the main source 1 as a function of this voltage measurement and to compare the deduced level of use with a limit level of use, this limit level of use corresponding to a level of use of the main source 1 close to a stalling situation; and
to act via the converter 4 to control (arrow 13) the supply of power from the auxiliary source 3 as a function of the result of the comparison. For example, the auxiliary source 3 may be controlled to supply power when the voltage measurement is less than or equal to the voltage Vh (or when the level of use reaches the limit level of use), and to switch off the supply of power from the auxiliary source 3 when the voltage measurement is greater than the voltage Vh (or when the level of use of the main source 1 is greater than the limit level of use).

In this example, coordination between the main source 1 and the auxiliary source 3 for powering the electrical load 2 of the aircraft is thus based solely on determining the level of use of the main source 1, and is deduced in this example relative to the voltage of the electricity network powering the electrical load 2.

Furthermore, in the above-described example, the voltage characteristic of the main source 1 is preconfigured/predetermined in the sense that the voltage value is deliberately correlated with the value of the electrical frequency of that source.

Nevertheless, such predetermination is not essential. For example, the electrical frequency of the emergency RAT may vary proportionality as a function of the speed of rotation of its blades 5, and the generator 6 may deliver a voltage value that is constant regardless of the electrical frequency delivered by the RAT.

Thus, in another embodiment, the level of use of the main source 1 is deduced directly from the electrical frequency that it delivers. The voltage delivered by the main source 1 is then not controlled as a function of its frequency, and by way of example it may be constant at the voltage value V0. An increase in the level of use of the main source 1 is deduced directly from its frequency. Thus, when the electrical frequency of the main source 1 drops and reaches a predetermined frequency value, e.g. the frequency f1, the auxiliary source 3 is then controlled to deliver a constant voltage value Vh in addition to the voltage delivered by the main source 1, which is maintained at the constant value V0.

Another embodiment for powering the electrical load 2 may be envisaged when the main source 1 is a rotary source for generating electricity. By way of example, the main source 1 may be an emergency RAT or a gas turbine.

A rotary source that generates electricity is commonly associated with a mechanical speed regulator 8. By way of example, for an emergency RAT having a synchronous electricity generator 6, the speed regulator 8 serves to adapt the pitch angle of the blades 5 so as to supply a regulated speed of rotation, and thus a regulated frequency of rotation within a range of frequencies, but not at a constant frequency. The electrical frequency output by the electricity generator 6 of the RAT is then proportional to the frequency of rotation. For an asynchronous electricity generator 6, the frequency of rotation of the blades 5 is commonly higher than the electrical frequency output by the electricity generator 6. The frequency of rotation of the blades 5 is nevertheless regulated within a predetermined frequency range, and may be determined indirectly from the electrical frequency output by the electricity generator 6, e.g. being deduced from the electrical frequency by means of an estimator or an observer.

Under nominal operating conditions, the rotary main source 1, which may equally well be synchronous or asynchronous, powers the electrical load 2 electrically at an electrical frequency that may be associated with a frequency of rotation that is regulated or maintained within a predetermined frequency range. More precisely, this frequency of rotation of the rotary main source 1 is regulated relative to a nominal frequency value and the bounds of the predetermined range correspond to frequency oscillations about the nominal frequency. By way of example, if the rotary main source 1 is an emergency RAT, the upper bound and the lower bound of the predetermined range lie typically at +10% of the selected nominal frequency.

In the envisaged embodiment, the electrical frequency output by the main source 1 is measured and compared with a frequency threshold value. With a synchronous generator, in which the electrical frequency is directly linked to the frequency of rotation, this frequency threshold value may correspond to the lower bound of the predetermined frequency range, or to a frequency close to that lower bound, e.g. that is a few tens of hertz (Hz) higher than that lower bound. With an asynchronous generator, the threshold value may be an electrical frequency correlated by means of an estimator or an observer with the lower bound of the predetermined frequency range, or correlated with a frequency close to the lower bound, e.g. a few hertz higher than the lower bound.

Under nominal circumstances, the rotary main source 1 is capable of supplying the power needed for the electrical load 2, so the electrical frequency output by the rotary main source 1 thus lies within a predetermined range and is greater than a threshold value.

Conversely, overuse of the rotary main source 1 may make it impossible to obtain an electrical frequency contained within the desired frequency range, and there is then a risk of observing the frequency drop to outside the range.

For example, with a synchronous emergency RAT, this drop in frequency may be linked to a reduction in the speed of rotation of the blades 5 linked to variation in the speed of the air, thus preventing the RAT from remaining within the predetermined frequency range and running the risk of leading to the RAT stalling. The electrical frequency output by the rotary main source 1 thus represents a level of use of that source. The predetermined frequency threshold value thus corresponds in this example to a limit frequency representing a predetermined level of use prior to there being a risk of the rotary main source 1 stalling. This threshold value may be an electrical frequency linked directly to the frequency of rotation of the rotary main source 1 with a synchronous generator, or indirectly linked with that frequency of rotation with an asynchronous generator, e.g. by using an observer or an estimator.

In order to mitigate the risk of the rotary main source 1 being overused, when the frequency output by the main source 1 is below the threshold value, the auxiliary source 3 is then caused to act via the converter 4 to supply the electrical load 2 with electrical power in addition to the power from the main source 1. The electrical power supply from the main source 1 is then provided so as to supply an electrical frequency that is synchronized on the electrical frequency of the main source 1. Specifically, the electrical frequency of the main source 1 may oscillate by a few Hz per second as a result of external conditions, such as the speed of the air, turbulence, or the electrical load being taken from the source. By way of example, such synchronization may be performed by servo-controlling the electrical frequency of the auxiliary source 3 on the electrical frequency of the main source 1 by means of a phase locked loop (PLL). The electrical load 2 is then powered both by the rotary main source 1 and by the auxiliary source 3. Advantageously, triggering the supply of power from the auxiliary source 3 serves to avoid the electrical frequency of the rotary main source 1 dropping below the threshold value. The electrical frequency delivered at the output from the rotary main source 1 can thus at least remain constant at the threshold value during a load peak, and then return into the predetermined regulation range corresponding to its nominal operation. When the electrical frequency delivered by the rotary main source 1 returns to above the threshold value frequency, the auxiliary source 3 is then controlled to stop supplying electric power to the electrical load 2. The supply of electrical power by the auxiliary source 3 is thus triggered to relieve the load on the rotary main source 1 only temporarily, i.e. for the time required for it to return into its nominal operating range, away from a risk of stalling.

The power taken from the rotary main source 1 is thus adapted while countering any risk of overuse that might lead to it stalling. Controlling the rotary main source 1 and the auxiliary source 3 in this way is particularly simple to achieve, since coordination between the rotary main source 1 and the auxiliary source 3 takes place via the electrical frequency at which the electrical load 2 is powered.

Once more, all of the above-described operations are performed in real time and continuously over time. These various operations may be controlled and monitored by a first control device 71 interfaced with the main source 1 and by a second control device 72 interfaced with the auxiliary source 3 via the converter 4. The first and second control devices 71 and 72 are devices that are independent in the sense that there is no direct communication link between those devices.

The first control device 71 is configured to control the electric power supplied by the rotary main source 1. By way of example, for an emergency RAT having a synchronous electricity generator 6, the first control device 71 is configured to receive (arrow 10) the voltage level output by the generator and to control (arrow 11) the main source 1 so as to regulate the voltage level on a fixed value.

Since the converter 4 is connected in parallel with the main source 1, the second control device 72 is then capable of determining the electrical frequency output by the main source 1, i.e. the frequency of the electricity bus powering the electrical load 2.

The second control device 72 is then configured:
to recover (arrow 12) a measurement of the electrical frequency across the terminals of the converter 4;

to compare the electrical frequency measurement with the frequency threshold value; and whenever the electrical frequency output by the rotary main source 1 reaches the frequency threshold value, to act via the converter 4 to control (arrow 13) the electrical power supplied by the auxiliary source 3 to the electrical load 2 at an electrical frequency that is synchronized on the electrical frequency of the main source.

Alternatively, the second control device 72 can deduce from the electrical frequency measurement the level of use of the rotary main source 1, can compare this level of use with the limit level of use, representing a level of overuse of the source, and can cause the auxiliary source 3 to supply power as a function of the result of the comparison.

Advantageously, such an embodiment for a rotary main source 1 is particularly simple to implement, since it does not require any modification (e.g. predetermining static voltage characteristics, reconfiguring the electricity generator 6) of existing rotary sources (e.g. emergency RAT, turbines). Coordination in this example between the rotary main source 1 and the auxiliary source 3 for powering the electrical load 2 of the aircraft is thus based solely on determining the level of use of the main source 1 as determined specifically from the electrical frequency output by the main source. This electrical frequency serves to determine the frequency of rotation of the main source, either directly with a synchronous generator or indirectly (via an estimator or an observer) with an asynchronous generator, where such frequency determination is commonly implemented in existing rotary main sources.

The invention claimed is:

1. A method of electrically powering at least one electrical load in an aircraft, the method comprising:
   providing a main source that generates electricity and an auxiliary source for storing electricity connected in parallel with the main source via a DC/AC power converter;
   operating the main source including
      electrically powering said at least one electrical load with the main source;
      measuring at least one instantaneous parameter characterizing the main source;
      determining a level of use of the main source from said at least one measured instantaneous parameter; and
      adjusting the voltage of the main source as a function of the determined level of use; and
   operating the auxiliary source including
      measuring an output voltage from the main source across terminals of the DC/AC power converter;
      comparing the measured output voltage from the main source with a predetermined voltage threshold value; and
      electrically powering said at least one electrical load from the auxiliary source when the measured output voltage from the main source is less than the predetermined threshold value, so as to supply additional electric power to the at least one electrical load,
   wherein the operating the main source and the operating the auxiliary source are performed in parallel and independently of each other.

2. The method according to claim 1, wherein the operating the main source further comprises causing the voltage supplied by the main source to decrease towards a preconfigured value whenever the level of use of the main source is greater than a predetermined level of use.

3. The method according to claim 1, wherein the operating the auxiliary source further comprises switching off the electrical power supplied by the auxiliary source when the measured voltage is greater than the predetermined voltage threshold value.

4. The method according to claim 1, wherein the main source is an emergency ram air turbine (RAT) and for which said at least one instantaneous parameter is at least one of a torque of the RAT, an electrical frequency of the power supplied to the at least one electrical load, a speed of rotation of blades of the RAT, or a pitch of the blades of the RAT.

5. The method according to claim 1, wherein the main source is a fuel cell, and wherein said at least one instantaneous parameter is at least one of a reagent flow rate, a temperature of the cell, or a degree of hydration of the cell.

6. The method according to claim 1, wherein the main source is an auxiliary power unit (APU), and wherein said at least one instantaneous parameter is at least one of a flow rate of fuel delivered to said APU a temperature of said APU.

7. A system for electrically powering at least one electrical load in an aircraft, the system comprising:
   a main source of electricity electrically connected to the at least one electrical load;
   an auxiliary source for storing electricity connected in parallel with the main source via a DC/AC power converter and electrically connected to the at least one electrical load; and
   a first control device configured t:
      cause said at least one electrical load to be electrically powered by the main source that generates electricity;
      determine a level of use of the main source from a measurement of at least one instantaneous parameter characterizing said source; and
      adjust the voltage of the main source as a function of the determined level of use; and
   a second control device configured to:
      recover a measurement of an output voltage from the main source across terminals of the DC/AC power converter;
      compare the measured output voltage with a predetermined voltage threshold value; and
      when the measured output voltage is less than the predetermined voltage threshold value, act via the converter to cause said at least one electrical load to be powered electrically by the auxiliary source for storing electricity, so as to supply additional electric power to the electrical load,
   wherein the first control device and the second control device are configured to operate in parallel and independently of each other, the first control device and the second control device being free of a direct communication link therebetween.

8. The system according to claim 7, wherein:
   the first control device is further configured to cause the voltage supplied by the main source to decrease towards a preconfigured value when the level of use of the main source is greater than a predetermined level of use; and
   the second control device is further configured to cause the electrical power supplied by the auxiliary source to be switched off when the measured output voltage from the main source is greater than the predetermined threshold value.

* * * * *